(12) United States Patent
Fjällström

(10) Patent No.: US 11,413,772 B2
(45) Date of Patent: Aug. 16, 2022

(54) INDUSTRIAL ROBOT SYSTEM WITH SUPERVISION SENSOR

(71) Applicant: ABB Schweiz AG, Baden (CH)

(72) Inventor: Emil Fjällström, Eskilstuna (SE)

(73) Assignee: ABB Schweiz AG, Baden (CH)

( * ) Notice: Subject to any disclaimer, the term of this patent is extended or adjusted under 35 U.S.C. 154(b) by 521 days.

(21) Appl. No.: 16/486,950

(22) PCT Filed: Feb. 22, 2017

(86) PCT No.: PCT/EP2017/054054
§ 371 (c)(1),
(2) Date: Aug. 19, 2019

(87) PCT Pub. No.: WO2018/153444
PCT Pub. Date: Aug. 30, 2018

(65) Prior Publication Data
US 2021/0129360 A1    May 6, 2021

(51) Int. Cl.
*G06F 17/00* (2019.01)
*B25J 19/00* (2006.01)
*B25J 13/08* (2006.01)

(52) U.S. Cl.
CPC ......... *B25J 19/0066* (2013.01); *B25J 13/087* (2013.01); *B25J 13/088* (2013.01); *B25J 19/0025* (2013.01); *B25J 19/0004* (2013.01)

(58) Field of Classification Search
CPC .... B25J 19/0066; B25J 13/087; B25J 13/088; B25J 19/0025; B25J 19/0004; B25J 19/02
(Continued)

(56) References Cited

U.S. PATENT DOCUMENTS 5,784,542 A * 7/1998 Ohm ...................... A61B 34/35
                                                              901/34
5,828,813 A * 10/1998 Ohm .......................... B25J 3/04
                                                              700/260
(Continued)

FOREIGN PATENT DOCUMENTS

CN      101186037 A      5/2008
CN      104097197 A     10/2014
(Continued)

OTHER PUBLICATIONS

International Search Report & Written Opinion of the International Searching Authority Application No. PCT/EP2017054054 Completed: Nov. 3, 2017; dated Nov. 17, 2017 12 Pages.
(Continued)

*Primary Examiner* — Ronnie M Mancho
(74) *Attorney, Agent, or Firm* — Whitmyer IP Group LLC

(57) ABSTRACT

An industrial robot system includes a manipulator with a drive chain including a motor unit. A controller in the industrial robot system is electrically connected to the drive chain by a set of power transmission lines and is operable to transmit electrical power on the set of power transmission lines so as to impart a controlled movement of the manipulator. A supervision sensor is arranged in the manipulator and configured to sense a property of the manipulator. The supervision sensor is electrically connected to at least a subset of the power transmission lines for transmission of sensor data representing the property to the controller.

18 Claims, 3 Drawing Sheets

(58) Field of Classification Search
USPC .......................................................... 700/258
See application file for complete search history.

(56) References Cited

U.S. PATENT DOCUMENTS

| | | | | |
|---|---|---|---|---|
| 5,908,458 | A * | 6/1999 | Rowe | E02F 3/437 |
| | | | | 701/50 |
| 5,986,423 | A * | 11/1999 | Matsumoto | B25J 19/0025 |
| | | | | 901/23 |
| 6,882,125 | B2 | 4/2005 | Kameda et al. | |
| 7,703,349 | B2 * | 4/2010 | Nihei | H05K 9/0098 |
| | | | | 901/46 |
| 8,396,596 | B2 | 3/2013 | Oka et al. | |
| 9,205,567 | B2 * | 12/2015 | Rose | B25J 19/005 |
| 9,375,852 | B2 * | 6/2016 | Rose | B25J 9/1612 |
| 9,475,199 | B2 * | 10/2016 | Burridge | B25J 13/088 |
| 9,752,336 | B2 * | 9/2017 | Meinert | G05D 3/12 |
| 9,796,097 | B2 * | 10/2017 | Kirihara | B25J 17/02 |
| 9,802,327 | B2 * | 10/2017 | Kirihara | B25J 19/0025 |
| 10,434,643 | B1 * | 10/2019 | Berkowitz | B25J 9/102 |
| 10,919,156 | B2 * | 2/2021 | Roberts | B25J 13/085 |
| 11,143,566 | B2 * | 10/2021 | Huang | G01M 3/20 |
| 2005/0103148 | A1 | 5/2005 | Inoue et al. | |
| 2009/0084927 | A1 * | 4/2009 | Nihei | B25J 9/08 |
| | | | | 901/50 |
| 2015/0068348 | A1 * | 3/2015 | Kirihara | B25J 19/0075 |
| | | | | 901/29 |
| 2015/0096401 | A1 * | 4/2015 | Nagai | B25J 9/126 |
| | | | | 901/23 |
| 2016/0271807 | A1 | 9/2016 | Kawauchi et al. | |
| 2017/0155344 | A1 * | 6/2017 | Nishino | H02P 27/06 |
| 2017/0226758 | A1 * | 8/2017 | Meinert | B33Y 30/00 |
| 2018/0069493 | A1 * | 3/2018 | Roberts | H02P 6/24 |

FOREIGN PATENT DOCUMENTS

| | | |
|---|---|---|
| CN | 103846925 B * | 9/2015 |
| CN | 105790445 A | 7/2016 |
| DE | 202016104294 U1 | 8/2016 |
| JP | 2006005535 A | 1/2006 |
| JP | 2013129003 A | 7/2013 |
| JP | 2014008569 A | 1/2014 |
| JP | 2014158178 A | 8/2014 |
| WO | 2005056249 A1 | 6/2005 |

OTHER PUBLICATIONS

Chinese Office Action; Application No. 201780073808.4; dated Sep. 29, 2021; 9 Pages.

* cited by examiner

INDUSTRIAL ROBOT SYSTEM WITH SUPERVISION SENSOR

TECHNICAL FIELD

The present invention generally relates to industrial robot systems, in particular to a technique of incorporating one or more supervision sensors in such systems.

BACKGROUND

Industrial robot systems are well known in the art and are used in a variety of environments. It is important that the reliability of the industrial robot system is high, since malfunctions may result in production stops, downtime for repair and need to acquire costly spare parts.

To obviate such malfunctions, industrial robot systems are regularly subject to manual inspection. These manual inspections are time-consuming and labor-intensive, and there is a risk that potential problems are overlooked. In one example, manual inspections are regularly scheduled to look for leaks of lubrication oil within the robot. One source of oil leaks is the gearbox in the mechanical drive chain for the respective joint of the robot. Oil leaks are known to occur at the mechanical interface between the gearbox and the motor in the drive chain, and some robots are designed with a dedicated evacuation channel at this mechanical interface to facilitate detection of oil leaks. A manual inspection for oil leaks requires service personnel to partly dismantle the robot for separate inspection of every joint or drive chain in the manipulator of the industrial robot. For example, a six axis manipulator has six drive chains to be inspected. Further, more than one location may need to be inspected for oil leaks in each drive chain.

The need for manual inspection may be reduced by installation of supervision sensors in the manipulator and automated monitoring of the sensor output for detection and prediction of malfunctions. However, a wired installation of supervision sensors in the manipulator may increase the complexity and cost of the industrial robot system. Further, installation of supervision sensors may actually add a potential cause of malfunction to the industrial robot system, e.g. malfunctions caused by the wiring to the sensors.

Different wired installations of sensors in industrial robot systems are e.g. disclosed in US2016/0271807, DE202016104294U1, U.S. Pat. No. 6,882,125, US2005/0103148 and U.S. Pat. No. 7,703,349.

SUMMARY

It is an objective of the invention to at least partly overcome one or more limitations of the prior art.

Another objective is to provide an industrial robot system with a simple and robust electrical installation of one or more supervision sensors.

One or more of these objectives, as well as further objectives that may appear from the description below, are at least partly achieved by an industrial robot system according to the independent claim, example embodiments being defined by dependent claims.

Still other objectives, as well as features, aspects and advantages of the present invention, may appear from the following detailed description, from the attached claim as well as from the drawings.

BRIEF DESCRIPTION OF THE DRAWINGS

Embodiments of the invention will now be described in more detail with reference to the accompanying schematic drawings.

DETAILED DESCRIPTION

Figure 1:
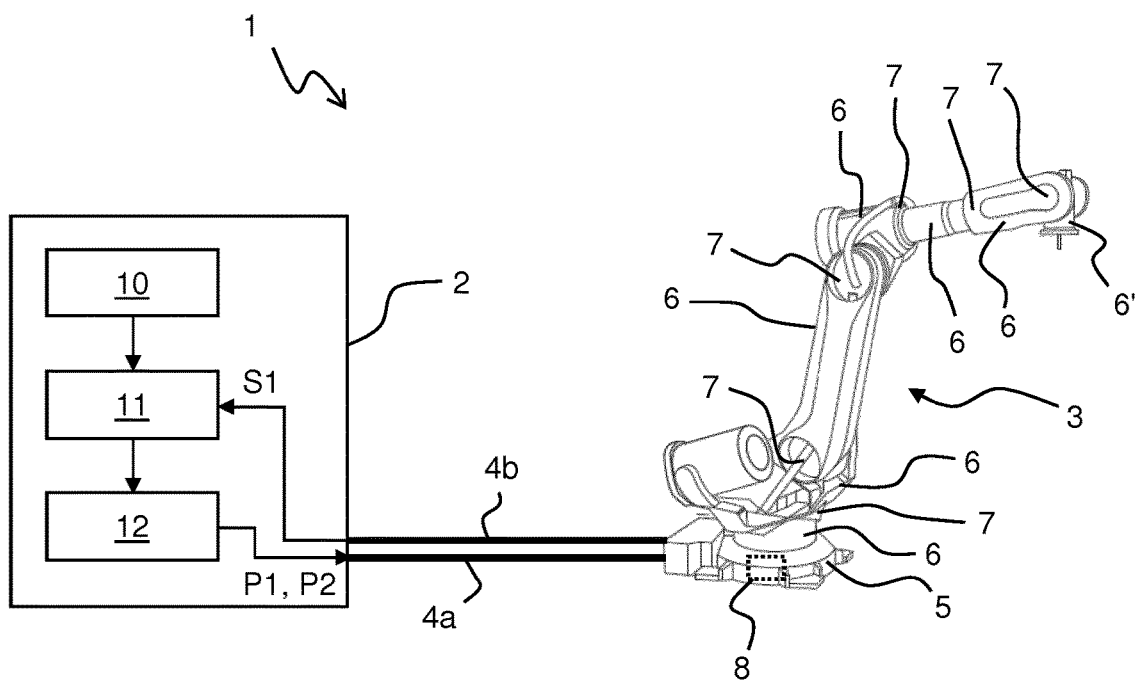
FIG. 1 illustrates an industrial robot system comprising a controller and a robotic manipulator.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Embodiments of the invention are directed to a technique of incorporating one or more supervision sensors into a manipulator of an industrial robot system while minimizing the need to redesign the electrical wiring within the manipulator.

As used herein, an "industrial robot system" comprises one or more manipulators and one or more controllers for operating the manipulator(s). Such a manipulator may be of different generic types.

One generic type is a robotic manipulator which is a jointed manipulation structure for attachment of an end effector, which is designed according to the work task to be performed by the robot. The robotic manipulator is typically configured for movement of the end effector in two or three dimensions. Generally, a robotic manipulator may be defined as an automatically controlled, reprogrammable, multipurpose manipulator with a plurality of degrees of freedom and an ability to perform work tasks independently. When combined with a controller, the robotic manipulator forms an "industrial robot". Many different robotic manipulators are known in the art, and the industrial robot is often characterized based on the movement of the robotic manipulator, e.g. as a Cartesian robot, cylindrical robot, spherical (polar) robot, articulated robot, gantry robot, etc.

Another generic type of manipulator is a "robot positioner", which is configured to carry and position the robotic manipulator in one, two or three dimensions.

A further generic type of manipulator is a workpiece manipulator, which is configured to carry and position a workpiece to be processed by the end effector of an industrial robot. For example, the workpiece manipulator may be configured to translate and/or rotate the workpiece.

It is understood that an industrial robot system may comprise any combination of these manipulators, which may be connected to a common controller or separate controllers.

In the following, with reference to FIGS. 1-4, embodiments of the invention will be described in relation to industrial robots.

FIG. 1 shows such an industrial robot 1, which comprises a controller or control unit 2 and a robotic manipulator 3. The controller 2 is electrically connected to the robotic manipulator 3 by a motor cable 4a and a measurement cable 4b, which alternatively may be combined into a single cable. The robotic manipulator 3 is an articulated manipulator and comprises a base 5 and a sequence of links 6 and joints 7 attached to the base 5. In FIG. 1, the links 6 and joints 7 are only schematically indicated. The links 6 are rigid members connecting the joints 7, and the joints 7 are movable components that enable relative motion between adjoining links 6. Each joint 7 defines an axis or degree of freedom of the manipulator. Generally, the respective joint 7 may be characterized as either a linear (prismatic) joint, which exhibits a sliding or linear (translational) motion along an axis, or a rotary (revolute) joint, which exhibits a rotary motion about an axis. The distal link 6' of the robotic manipulator 3 is configured for attachment of an end effector (not shown). The movement at the respective joint 7 is governed by a drive chain for the joint 7. As used herein, the "drive chain" of a joint 7 designates the mechanical sequence of structurally interconnected components that collectively operate to generate a force and mechanically convert the force into a relative motion of the links 6 connected at the joint 7. The force of the respective drive chain is generated by an actuator, which may but need not be located at its associated joint. In the following, it is presumed that the actuator is an electrical motor, specifically a servomotor. Depending on implementation, the servomotor may be a stepper motor, a DC-brush motor, a DC brushless motor, an AC synchronous motor or an AC asynchronous motor.

The controller 2 is configured to operate the drive chains of the manipulator so as to achieve a desired robot motion, e.g. a trajectory of the end effector. In the example of FIG. 1, the controller 2 comprises a main computer 10, an axis computer 11 and a set of drive units or drivers 12 (one shown). The main computer 10 operates a software program that defines the desired robot motion. Based on the software program, the main computer 10 sends motion commands to the axis computer 11. The axis computer 11 is configured to convert the respective motion command to a desired movement of the respective joint 7. The controller 2 may comprise one driver 12 for each drive chain in the manipulator 3, where each driver 12 is configured to convert the desired movement of the respective joint 7 into a motor power signal P1 for the servomotor of the drive chain associated with the joint 7. Typically, the servomotor is directly controlled by the signal P1, in that the signal P1 contains power pulses that energize the servomotor to cause a desired motion of a driven shaft of the servomotor. In other words, the signal P1 defines a modulated power flow to the servomotor for execution of a desired motion. For servomotors, the driver 12 may comprise a so-called servo amplifier for generating the signal P1.

In a variant, not shown, all or part of the controller 2 may be installed in the manipulator 3. For example, at least part of the functionality of the drivers 12 may be implemented by one or more local drive units in the manipulator 3.

As indicated in FIG. 1, the respective driver 12 transmits the signal P1 to the servomotor via the motor cable 4a, and the controller 2 also transmits a brake power signal P2 for a brake (see below) associated with the servomotor. FIG. 1 also indicates that a measurement signal S1 is provided from the manipulator 3 to the axis computer 11 via the measurement cable 4b. The measurement signal S1 indicates the actual position of the respective joint and thereby allows the axis computer 11 to precisely control the movement of the manipulator 3. As explained further below, the measurement signal S1 contains measurement data generated by a position sensor, possibly in combination with a revolution sensor, associated with the respective drive chain. The measurement cable 4b may be electrically connected to each position sensor (and revolution sensor, if included). Alternatively, the manipulator 3 may include a dedicated data collection unit 8 (indicated by dotted lines in FIG. 1) for collecting data from these sensors and providing the measurement signal S1 as a digital signal via the measurement cable 4b. Such a dedicated data collection unit 8 is commonly known as a serial measurement board (SMB).

Figure 2:
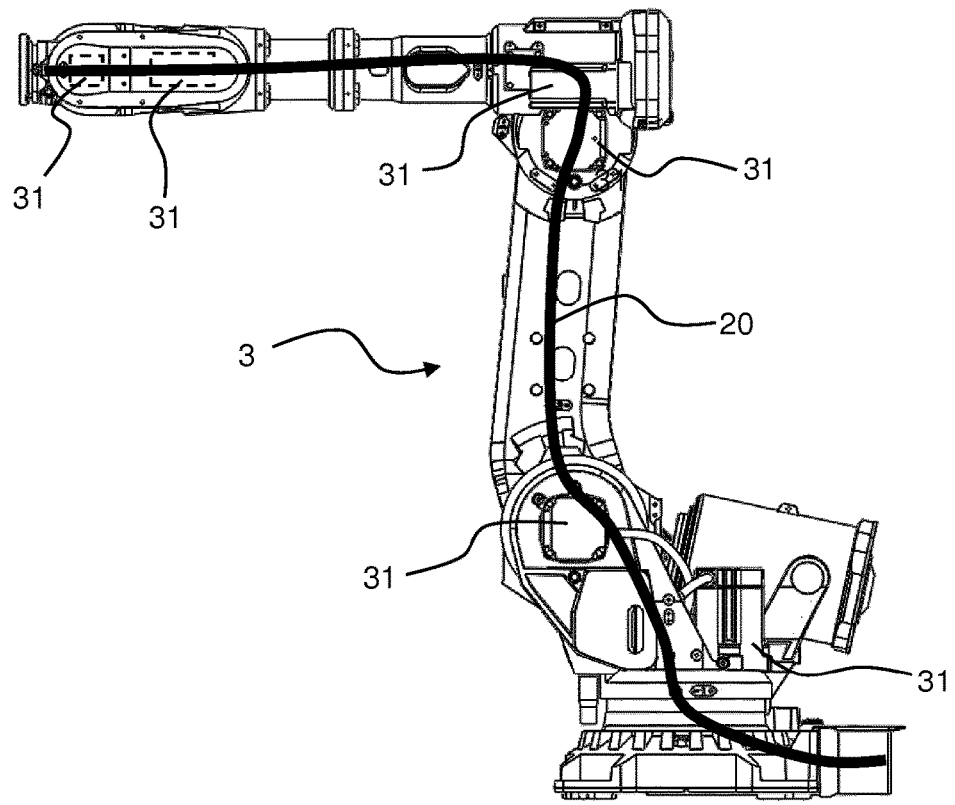
FIG. 2 is an elevated side view of the robotic manipulator in FIG. 1.

It should be understood that the motor cable 4a includes a plurality of wires for transmitting the signals P1, P2 to the servomotors and the brakes. Within the manipulator 3, one or more wires extend from the motor cable 4a to the respective servomotor and to the respective brake. Likewise, one or more wires extend inside the manipulator 3, from the respective position detector to the measurement cable 4b or to the data collection unit 8, if present. FIG. 2 schematically illustrates the location of servomotors 31 in the robotic manipulator 3 of FIG. 1. As seen, the servomotors 31 and thus the drive chains are distributed throughout the manipulator. FIG. 2 also indicates the extent of the wiring 20 that includes the above-mentioned wires. As understood, the wiring 20 needs to be carefully guided through the manipulator 3 so as to not obstruct its motion or to get damaged by tensioning or pinching between moving parts. The wiring 20 is typically arranged in a flexible cable harness (not shown) that holds the included wires together and shields them from mechanical damage.

Figure 3:
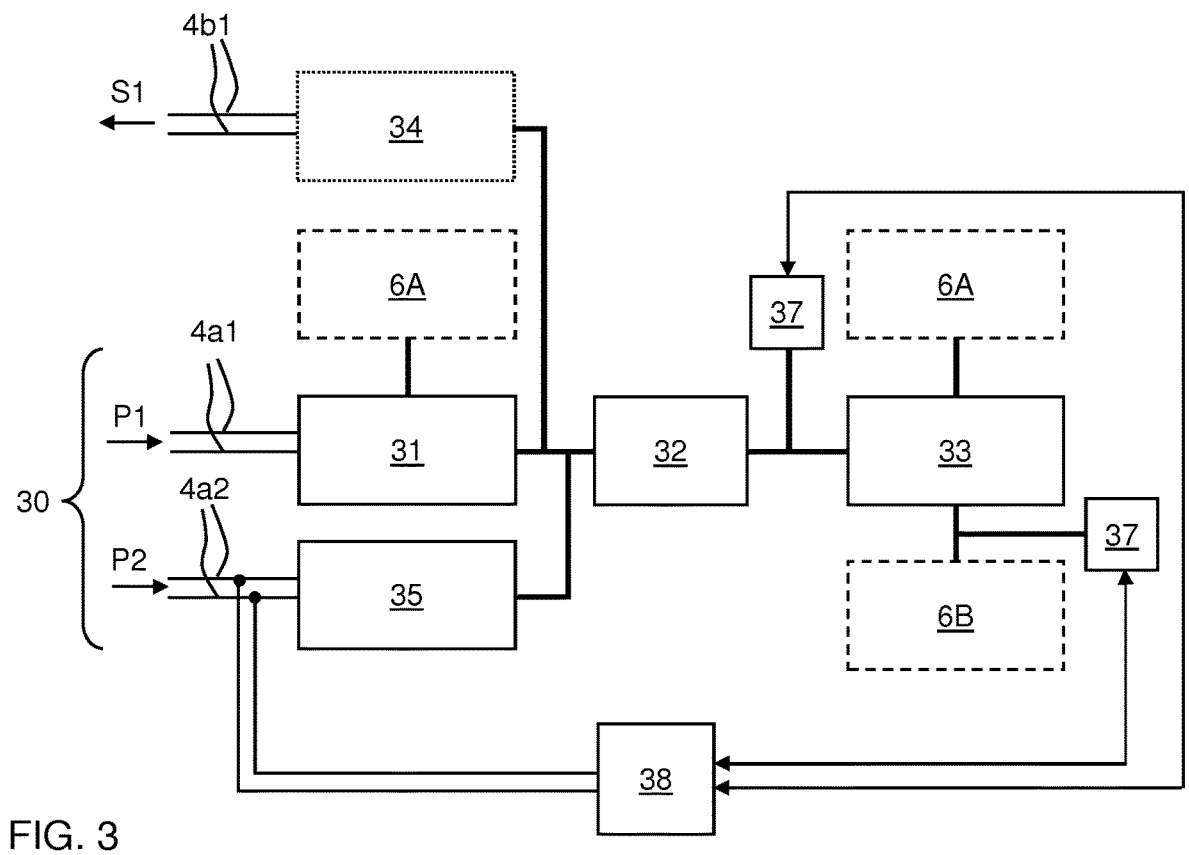
FIG. 3 is a block diagram of a mechanical drive chain for an actuated joint in the manipulator in FIGS. 1-2.
Figure 4:
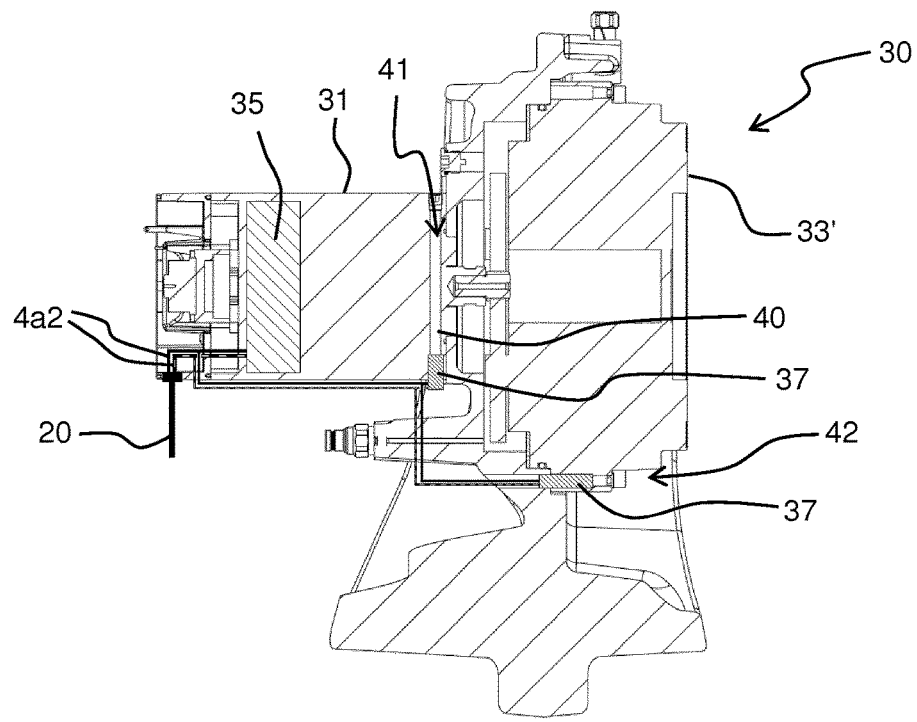
FIG. 4 is a section view of an actuated joint and an associated drive chain.

FIG. 3 is a block diagram of a drive chain 30 for a joint (cf. 7 in FIG. 1). The drive chain 30 is attached to and extends between two links (cf. 6 in FIG. 1), which are designated 6A, 6B in FIG. 3. The drive chain 30 is configured to effect a controlled movement of link 6B relative to link 6A. In FIG. 3, thick lines between boxes represent mechanical connections/components and thin lines represent electrical connections. Although the electrical connections are represented by pairs of wires in FIG. 3, it is realized that any number of wires may be used, including a single wire. In the illustrated example, the drive chain 30 comprises a servomotor 31 which is attached to link 6A. The servomotor 31 is electrically connected to wires 4a1 ("motor power wires") that transmit the signal P1 from the driver 12 for the drive chain 30 (FIG. 1). The servomotor 31 has a driven shaft, i.e. a shaft that is driven to rotate around its axis. The driven shaft is connected by a coupling 32 to an input element of a transmission 33, which is also attached to link 6A. The transmission 33 comprises one or more gears or gear trains arranged to convert the rotational speed and/or torque between the input element and an output element of the transmission 33, or to transform the rotational movement of the input element to a linear movement of the output element of the transmission 33. At least part of the transmission 33 may be contained in a dedicated housing defining a gearbox, which holds oil for lubrication of the included components. The output element of the transmission 33 is engaged with link 6B.

FIG. 3 also illustrates a position detector 34 (represented by a dotted box), which is associated with the drive chain 30 and arranged to sense the instantaneous rotational position of the servomotor 31. The position detector 34 may be attached to the output shaft of the servomotor 31 (as shown), or to any suitable component of the transmission 33, or even be incorporated into the servomotor 31. As is known in the art, the position detector 34 may be a resolver, which is configured to generate an analog signal, or a rotary encoder, which is configured to generate a digital signal. The position detector 34 is electrically connected to wires 4$b$1 that transmit the measurement signal S1 to the axis computer 11 through the measurement cable 4$b$, optionally via the dedicated data collection unit 8 (FIG. 1). Although not shown in FIG. 3, the drive chain 30 may also be associated with a revolution counter, e.g. a tachometer, which senses the rotational speed of the output shaft of servomotor 31. Such a revolution counter may be electrically connected to a dedicated wire pair in analogy with the position detector 34.

The drive chain 30 further comprises a brake 35, which is configured to selectively lock (on position) and release (off position) the drive chain 30, so as to prevent and allow, respectively, relative movement between links 6A, 6B. The brake 35 is electrically connected to wires ("brake power wires") 4$a$2 to receive the brake power signal P2 from the controller 2 (FIG. 1). The signal P2 controls the switching between on and off positions. For example, the brake 35 may be configured to selectively bring a dedicated friction element (not shown) into locking engagement with any suitable component of the drive chain 30, e.g. the output shaft of the servomotor 31 (as shown), or a component of the transmission 33. Alternatively, the brake 35 may be incorporated into the servomotor 31. In one embodiment, the brake 35 is a fail-safe brake, i.e. a brake that switches to the on position when an electrical characteristic of the signal P2 falls below a threshold, e.g. given in terms of voltage, current or power. Such fail-safe brakes 35 are common in industrial robots. When power is restored above the threshold, the fail-safe brake 35 switches to and stays in the off position. Many different types of fail-safe brakes are known in the art, including spring-set brakes and permanent-magnet brakes.

In the following, it is assumed that the brake 35 is a fail-safe brake. This means that the controller 2 supplies sufficient power to the brake, via the signal P2, at all times during movement of the manipulator 3. Depending on the configuration of the brake 35, the signal P2 may be either a DC signal or an AC signal. In one embodiment, the signal P2 is a 24V DC signal, and the above-mentioned threshold may be set to about 22V or less.

As noted above (FIG. 2), the wiring 20 is a critical component for industrial robot systems when it comes to reliability. It is generally desirable to keep the number of wires in the wiring 20 to a minimum. At the same time, it may be desirable to include one or more dedicated supervision sensors in the manipulator 3 to monitor one or more properties. Such properties may be any one of temperature, pressure, humidity, moisture, dust, force, torque, as well as presence of a general or specific liquid or substance. Reverting to FIG. 3, the illustrated embodiment obviates or reduces the need to include additional dedicated wires in the wiring 20, for supplying power to the supervision sensors 37 and/or for transmitting sensor data from the supervision sensors 37 to the controller 2. In the illustrated embodiment, this is achieved by connecting the respective sensor 37 to transmit the sensor data and receive power via the wires 4$a$2. A signal conditioning unit (SCU) 38 is arranged to receive an analog or digital sensor signal from the respective sensor 37 and to transmit sensor data given by the sensor signal on the wires 4$a$2. The SCU 38 thereby operates as a signal transmitter. The controller 2 comprises a corresponding signal receiver configured to retrieve the sensor data from the wires 4$a$2. Typically, the controller 2 is configured to actuate all brakes 35 in the manipulator 3 in unison, and therefore the wires 4$a$2 from all brakes 35 may be connected to a single node in the controller 2, and thus to a common signal receiver.

In the example of a fail-safe brake 35, in which the signal P2 transmits power to the brake during operation of the manipulator 3, the SCU 38 may be configured to encode the sensor data in the signal P2, e.g. by superposition or modulation of a low energy information signal onto signal P2, e.g. according to any known power-line communication (PLC) technique, as is well-known in the art. Since the brake 35 and the controller 2 are both connected to ground, the signal P2 with the encoded sensor data will be available at the controller 2 for decoding by the signal receiver(s). The sensor data may be communicated according to any suitable communication protocol. If the wires 4$a$2 are connected to a single node in the controller 2, the sensor data may include a unique identifier of the respective sensor 37 in addition to one or more sensor values representing the measured property.

In the illustrated embodiment, the SCU 38 is also configured to divert power from the wires 4$a$2 and supply an adequate amount of power to the respective sensor 37. In the example of a fail-safe brake 35, the diverted power should be less than the difference between the power supplied by the driver 12 and the power level corresponding to the above-mentioned threshold. The power required by the sensor 37 is typically much smaller than the power required to release the fail-safe brake 35.

It should be noted that the SCU 38 may be configured to supply power and transmit sensor data also when the fail-safe brake 35 is set in the on position, provided that the controller 2 provides power on the wires 4$a$2 also in the on position, i.e. at a level below the power level corresponding to above-mentioned the threshold. To ensure an ability to transmit sensor data in the event of a complete power outage, the SCU 38 may be connected to a local battery or capacitance that provides backup power.

In an alternative embodiment, the SCU 38 is connected to divert power for powering the sensor 37 from one or more other power transmitting wires, e.g. wires 4$a$1.

In a further alternative embodiment, the SCU 38 is only configured to transmit the sensor data and does not divert power to the respective sensor 37. The sensor 37 may instead be powered by the controller 2 via one or more dedicated power wires included in the wiring 20. Alternatively, the sensor 37 may be powered by a power source in the manipulator 3, such as a battery, capacitor, energy harvesting device, solar cell, etc. In these embodiments, the SCU 38 may be able to transmit the sensor data also in absence of power on the wires 4$a$2.

In a further alternative embodiment, the SCU 38 is only configured to divert power to the respective sensor 37 and does not transmit sensor data. The sensor 37 may instead be configured for wireless transmission of sensor data to the controller 2.

The skilled person readily understands that the foregoing techniques for transmitting sensor data and/or diverting power are equally applicable for a non-fail-safe brake 35.

In a further alternative embodiment, each of the supervision sensors 37 is instead electrically connected to the wires 4a1, in the same way as described above for the wires 4a2. However, it is currently believed that both transmission of sensor data and supply of power to the sensors(s) 37 are facilitated by connection to the wires 4a2, in view of the fact that the signal P2 generally contains less high frequency components and typically carries lower power than the signal P1.

It should be understood that the supervision sensor(s) 37 may have any location within the manipulator 3, depending on the property to be monitored. In one embodiment, at least one supervision sensor 37 is associated with each drive chain 30. The sensor 37 may e.g. be attached to the input or output element of the transmission 33 (as shown in FIG. 3), to a link 6A, 6B, onto or within a gearbox in the transmission 33, to a bearing, onto or within the servomotor 31, etc.

In one specific implementation, the supervision sensor 37 is arranged to detect leakage of oil in the drive chain 30. The oil leakage sensor 37 may or may not be capable of differentiating between liquids containing hydrocarbons and other liquids (including water). It should be understood that leakage of oil from the drive chain 30 may reduce the life of the industrial robot and result in need for substantial repair and operational standstill, if not detected in time. Many manufacturers therefore recommend regular, visual inspections of the drive chain 30 for oil leakage. It is realized that this is a demanding task, since the inspections follow strict routines. Further, the drive chains 30 are distributed within the manipulator 3 and it is necessary to access each drive chain 30 for inspection. These visual inspections may be obviated by installation of one or more oil leakage sensors 37 in each drive chain 30 in accordance with embodiments of the invention. An example of such an installation is given in FIG. 4, which is a section view of a drive chain 30 comprising a servomotor 31, a brake 35 and a gearbox 33'. All internal details of the servomotor 31, gearbox 33' and brake 35 have been omitted in FIG. 4. The gearbox 33' holds lubrication oil. In the illustrated example, one oil leakage sensor 37 is installed at an evacuation channel 40 for oil evacuation in case of oil leakage. The evacuation channel 40 extends in the servomotor 31 at the mechanical interface 41 between the servomotor 31 and the gearbox. Another oil leakage sensor 37 is installed at the mechanical interface 42 between the gearbox 33' and the link coupled to the output element of the gearbox 33'. Further oil sensors may be installed in the drive chain 30, e.g. at lubrication points of an automatic lubrication system, e.g. at bearings. In the illustrated example, the above-mentioned SCU (cf. 38 in FIG. 3) is integrated with the respective sensor 37.

All of the embodiments described in the foregoing involve an industrial robot system comprising a manipulator, which comprises a base, a moveable part, and a drive chain for moving the moveable part in relation to the base, where the drive chain comprises a motor unit with a driven shaft which is mechanically coupled to the moveable part. The industrial robot system also comprises a controller which is electrically connected to the drive chain by power transmission lines and is operable to transmit electrical power on the power transmission lines so as to impart a controlled movement of the moveable part in relation to the base, and a supervision sensor arranged in the manipulator and configured to sense a property of the manipulator, wherein the supervision sensor is electrically connected to transmit sensor data representing the property on at least a subset of the power transmission lines. In the example of FIGS. 1-3, the base corresponds to base 5, the moveable part corresponds to any of the links 6, e.g. link 6A or 6B in FIG. 3, the drive unit corresponds to drive unit 30, the motor unit corresponds to servomotor 31, the controller corresponds to controller 2, the supervision sensor corresponds to sensor 37, and the power transmission lines correspond to wires 4a1, 4a2. It is realized that such an industrial robot system may be conveniently obtained by retrofitting existing manipulators with one or more supervision sensors, in a simple and cost-effective way, without the need to update the wiring 20 that extends through the manipulator 3. Further, such an industrial robot system may be manufactured without the need to redesign the wiring 20 of existing manipulators.

The manipulator of this industrial robot system need not be a robotic manipulator as exemplified in FIGS. 1-3, but could be any other type of manipulator as used in industrial robot systems, e.g. the above-mentioned robot positioner or workpiece manipulator. Thus, all of the foregoing embodiments are equally applicable to such other types of manipulators.

Figure 5:
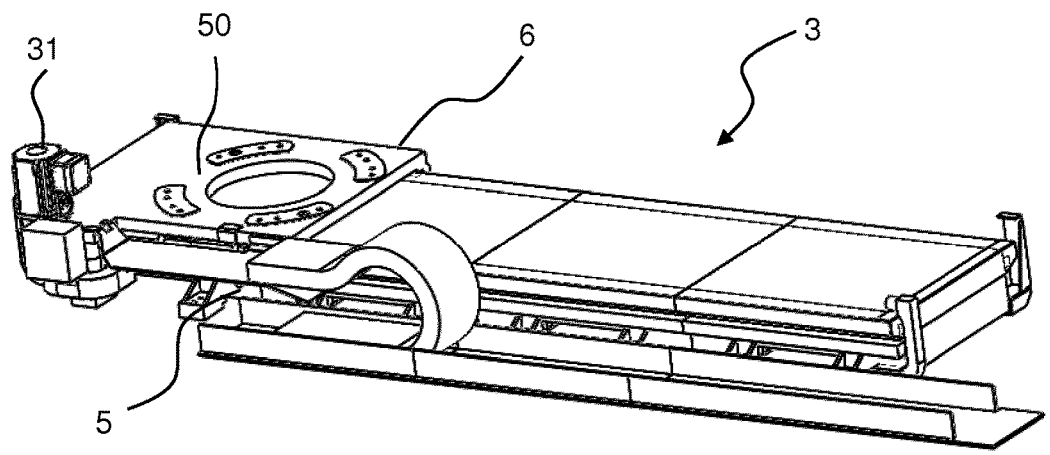
FIG. 5 is a perspective view of a robot positioner for an industrial robot system.

FIG. 5 shows an example of a robot positioner 3, also known as "track motion". The robot positioner 3 comprises a support element 5 (base), and a carriage 6 (moveable part), which is arranged for movement along a rail on the support element 5. The carriage 6 defines a platform 50 for attachment of a robotic manipulator. The robot positioner 3 comprises an electric motor 31, which forms a motor unit and is part of a drive chain (not shown) that imparts a movement to the carriage 6 in relation to the support element 5. The robot positioner 3 may be controlled by a controller to move the carriage 6 in coordination with a robotic manipulator mounted onto the platform 50.

Figure 6:
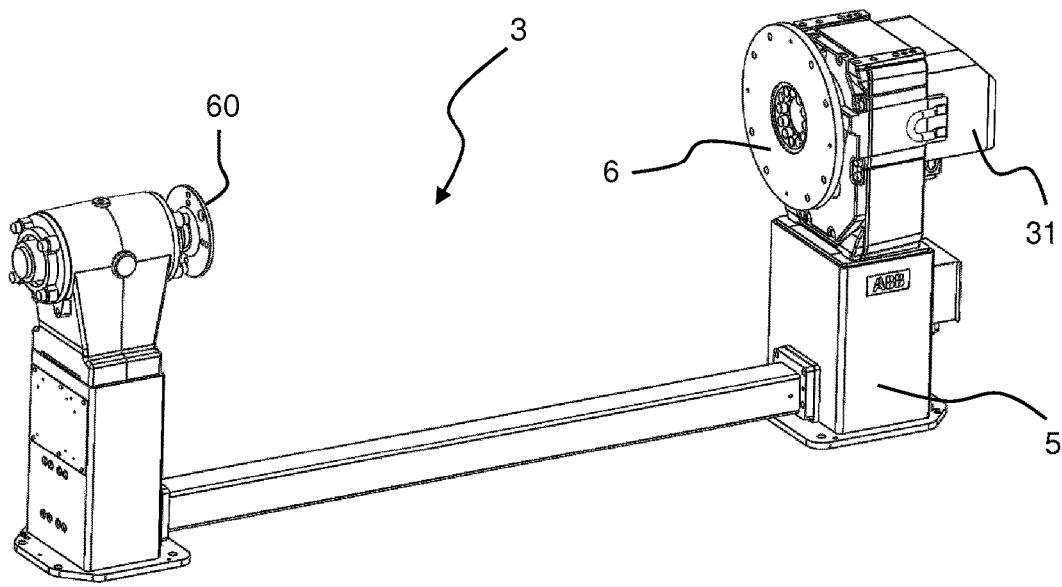
FIG. 6 is a perspective view of a workpiece manipulator for an industrial robot system.

FIG. 6 shows an example of a workpiece manipulator 3, also known as "work-piece positioner". The illustrated workpiece manipulator 3 is configured to impart a horizontal rotation to a workpiece. The workpiece manipulator 3 comprises a support element 5 (base) and a driven mounting plate 6 (moveable part), which is arranged for rotational movement around a horizontal axis. The driven mounting plate 6 and an opposing free-turning mounting plate 60 define a mounting region for a workpiece for processing by a robotic manipulator. The workpiece manipulator 3 comprises an electric motor 31, which forms a motor unit and is part of a drive chain (not shown) that imparts a movement to mounting plate 6 in relation to the support element 5. The workpiece manipulator 3 may be controlled by a controller to rotate the plate 6 in coordination of with a robotic manipulator that operates on a workpiece mounted between the plates 6, 60.

The invention claimed is:

1. An industrial robot system, comprising:
    a manipulator having a base, a moveable part, and a drive chain for moving the moveable part in relation to the base, wherein the drive chain includes a motor unit with a driven shaft which is mechanically coupled to the moveable part,
    a controller which is electrically connected to the drive chain by a set of power transmission lines and is operable to transmit electrical power on the set of power transmission lines so as to impart a controlled movement of the moveable part in relation to the base, and a supervision sensor arranged in the manipulator and configured to sense a property of the manipulator,
wherein the supervision sensor is electrically connected to at least a subset of the power transmission lines for transmission of sensor data representing said property to the controller,
wherein the sensor data includes an identifier of the supervision sensor, and one or more sensing values representing the property.

2. The industrial robot system of claim 1, wherein the supervision sensor is further electrically connected to at least one of the power transmission lines for receiving electrical power for powering the supervision sensor.

3. The industrial robot system of claim 1, wherein the supervision sensor is electrically connected to said at least a subset of power transmission lines by a signal conditioning unit, which is configured to encode the sensor data into a power signal which is applied by the controller onto said at least a subset of the power transmission lines.

4. The industrial robot system of claim 3, wherein the signal conditioning unit is further configured to divert power from the power signal and distribute the diverted power to the supervision sensor for powering the supervision sensor.

5. The industrial robot system of claim 1, wherein the set of power transmission lines include one or more first power transmission lines connected to the motor unit and one or more second power transmission lines connected to a brake device in the drive chain.

6. The industrial robot system of claim 5, wherein the brake device is configured to switch from a first, default state to a second state when energized, wherein the controller is configured to transmit electrical power on the one or more second power transmission lines to switch the brake device from the first state to the second state, and wherein the supervision sensor is connected to the one or more second power transmission lines for transmission of the sensor data.

7. The industrial robot system of claim 6, wherein the controller is configured to transmit the electrical power on the one or more second power transmission lines as a DC signal.

8. The industrial robot system of claim 6, wherein the brake device is configured to prevent the controlled movement of the moveable part in the first state, and to allow the controlled movement of the moveable part in the second state.

9. The industrial robot system of claim 1, further comprising a position detector which is associated with the drive chain and configured to generate position indicating data for the motor unit and to transmit the position indicating data to the controller on one or more dedicated signal transmission lines.

10. The industrial robot system of claim 1, wherein the supervision sensor is configured to sense a property included in the group including: pressure, temperature, moisture, humidity, liquid, dust, force, torque, and presence of a general or specific liquid or substance.

11. The industrial robot system of claim 1, wherein the supervision sensor is configured to sense presence of oil.

12. The industrial robot system of claim 1, wherein the drive chain further includes a gearbox containing lubrication oil, wherein said supervision sensor is configured and arranged to detect leakage of said lubrication oil from the gearbox.

13. The industrial robot system of claim 12, wherein the supervision sensor is arranged at a mechanical interface between the motor unit and the gearbox and/or between the gearbox and the moveable part.

14. The industrial robot system of claim 1, wherein the base, the moveable part, the drive chain, and the supervision sensor are included in a manipulator device, and wherein the controller is located remotely from the manipulator device.

15. The industrial robot system of claim 2, wherein the supervision sensor is electrically connected to said at least a subset of power transmission lines by a signal conditioning unit, which is configured to encode the sensor data into a power signal which is applied by the controller onto said at least a subset of the power transmission lines.

16. The industrial robot system of claim 2, wherein the set of power transmission lines include one or more first power transmission lines connected to the motor unit and one or more second power transmission lines connected to a brake device in the drive chain.

17. The industrial robot system of claim 7, wherein the brake device is configured to prevent the controlled movement of the moveable part in the first state, and to allow the controlled movement of the moveable part in the second state.

18. The industrial robot system of claim 2, further comprising a position detector which is associated with the drive chain and configured to generate position indicating data for the motor unit and to transmit the position indicating data to the controller on one or more dedicated signal transmission lines.

\* \* \* \* \*